(12) United States Patent
Hamel

(10) Patent No.: US 9,995,070 B2
(45) Date of Patent: Jun. 12, 2018

(54) HINGE RELEASE MECHANISM

(71) Applicant: Apple Inc., Cupertino, CA (US)

(72) Inventor: Bradley J. Hamel, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/252,169

(22) Filed: Aug. 30, 2016

(65) Prior Publication Data

US 2018/0058120 A1    Mar. 1, 2018

(51) Int. Cl.
| | |
|---|---|
| *G06F 1/16* | (2006.01) |
| *E05D 11/08* | (2006.01) |
| *E05D 11/10* | (2006.01) |
| *H01F 7/02* | (2006.01) |

(52) U.S. Cl.
CPC ............ *E05D 11/082* (2013.01); *E05D 11/10* (2013.01); *G06F 1/1616* (2013.01); *G06F 1/1677* (2013.01); *G06F 1/1681* (2013.01); *H01F 7/0242* (2013.01); *E05Y 2900/606* (2013.01)

(58) Field of Classification Search
CPC .................................................. G06F 1/1616
See application file for complete search history.

(56) References Cited

U.S. PATENT DOCUMENTS

| | | | | |
|---|---|---|---|---|
| 6,741,456 B2 * | 5/2004 | Sellers | ............... | G06F 1/1616 16/338 |
| 9,152,183 B2 * | 10/2015 | Kurczewski | .......... | G06F 1/1681 |
| 9,557,778 B2 | 1/2017 | Sung et al. | | |
| 9,778,703 B2 * | 10/2017 | Senatori | ................ | G06F 1/1679 |
| 2009/0316348 A1 * | 12/2009 | Tseng | .................... | G06F 1/1616 361/679.28 |
| 2010/0238620 A1 * | 9/2010 | Fish | ...................... | G06F 1/1616 361/679.09 |
| 2012/0154288 A1 * | 6/2012 | Walker | .................. | G06F 1/1616 345/169 |
| 2012/0250241 A1 * | 10/2012 | Minemura | ............ | G06F 1/1616 361/679.21 |
| 2014/0268555 A1 * | 9/2014 | Kurczewski | .......... | G06F 1/1681 361/679.55 |
| 2014/0285960 A1 * | 9/2014 | Sharma | ................. | G06F 1/1654 361/679.28 |

(Continued)

*Primary Examiner* — Anthony Q Edwards
(74) *Attorney, Agent, or Firm* — Dickinson Wright RLLP

(57) ABSTRACT

An electronic device with an enclosure having a base and a base is disclosed. The electronic device can include a shaft coupled with the base and the base. The shaft can be coupled with a torque component engagement feature that provides a frictional engagement with the shaft. The torque component engagement feature can magnetically couple with a magnet, or magnets. The electronic device can also include a magnetic assembly configured to magnetically couple with the shaft engagement. The magnetic assembly can provide a first magnetic field that magnetically couples the torque component engagement feature with the magnetic assembly. However, the magnetic assembly can change to a second, reduced magnetic field less than the first magnetic field. When the display assembly is rotated toward the base, the magnetic assembly changes to the second magnetic field, and the torque component engagement feature magnetically decouples from the magnetic assembly based on the reduced magnetic field.

20 Claims, 6 Drawing Sheets

(56) References Cited

U.S. PATENT DOCUMENTS

| | | | |
|---|---|---|---|
| 2015/0009614 A1* | 1/2015 | Tsai | G06F 1/1681 |
| | | | 361/679.27 |
| 2017/0068283 A1* | 3/2017 | Liang | G06F 1/1616 |
| 2017/0131745 A1* | 5/2017 | Sharma | G06F 1/1669 |
| 2017/0133802 A1* | 5/2017 | Sharma | H01R 24/58 |

* cited by examiner

HINGE RELEASE MECHANISM

FIELD

The described embodiments relate to electronic devices. In particular, the following embodiments relate to kinematics of a hinge assembly.

BACKGROUND

Electronic devices, such as laptop computers, can include multiple parts attached together by way of a hinge assembly. For example, a conventional laptop computer generally has a base connected to a base portion by way of a hinge assembly that provides a torque that allows the base to remain at a fixed angular displacement with respect to the base portion. However, when the base is secured to the base portion in a closed configuration, the torque provided by the hinge assembly results in a bending moment that causes deformation of at least the base.

SUMMARY

In one aspect, a portable electronic device having a first part and a second part is described that includes at least a processor, a hinge assembly that rotatably couples the first part and the second part and that includes a torque component that provides a torque. The portable electronic device also includes a torque component coupling unit that cooperates with the hinge assembly to de-couple at least the first part and the torque component in a closed configuration and couple at least the first part and the torque component in an open configuration.

In another aspect, a portable electronic device having a base portion and a base is described. The portable electronic device can include a shaft having a cavity. The shaft may couple with at least one of the base and the base portion and a torque element configured to provide a torque in response to a rotation of the shaft. In some instances, the rotation is caused by the base rotating with respect to the base portion, or vice versa. The portable electronic device can further include torque component engagement feature that includes an opening to receive and engage the shaft. The portable electronic device can further include a magnetic assembly that magnetically couples with the torque component engagement feature based on a first magnetic field from the magnetic assembly. In some embodiments, the magnetic assembly is configured to change to a second magnetic field different from the first magnetic field allowing the torque component engagement feature to magnetically decouple from the magnetic assembly in accordance with a relative position of the base and the base portion.

In another aspect, a method for assembling a portable electronic device having a base and a base portion is described. The method can include coupling a shaft with the base and the base portion. The method can further include securing the shaft through an opening of a torque component engagement feature. The method can further include inserting a magnetic assembly in the portable electronic device. The magnetic assembly can be configured to magnetically retain the torque component engagement feature by a first magnetic field of the magnetic assembly in response to a force that rotates the base. Also, the magnetic assembly can further be capable of forming a second magnetic field different from the first magnetic field that allows the torque component engagement feature to decouple from the magnetic assembly in response to the force to the base.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
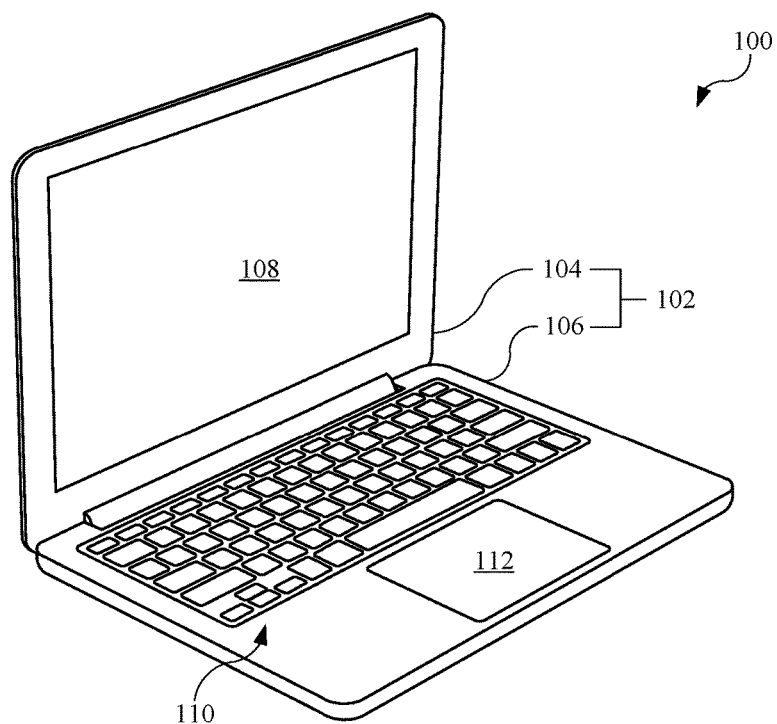
FIG. 1 illustrates an isometric view of an embodiment of an electronic device in an open configuration, in accordance with the described embodiments.

Those skilled in the art will appreciate and understand that, according to common practice, various features of the drawings discussed below are not necessarily drawn to scale, and that dimensions of various features and elements of the drawings can be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

The described embodiments relate to an electronic device that can take the form of a laptop computer having a base rotatably coupled to a base portion by way of a hinge assembly. Generally speaking, the hinge assembly can have a shaft that defines an axis of rotation about which the base can move with respect to the base portion. The hinge assembly can provide a constant and/or variable torque depending on specific design and user considerations. For example, when the design requires that the base retain a fixed position, or angular displacement, relative to the base portion in an open configuration, the hinge assembly can provide an overall hinge assembly torque that can balance a torque generated by the base in the open configuration. Lid torque $\tau_{lid}$ generated by the base can be related to a relative position of the base to the base portion being within a range of angular displacement. Accordingly, the hinge assembly can include a number of torque generating components each of which provide a torque $\tau_i$ that combine to provide the overall hinge assembly torque in accordance with Equation (1) below. Equilibrium requires that hinge torque $\tau_{hinge}$ be equal to or greater than a maximum value of lid torque $\tau_{lid}$ that occurs when the base is essentially horizontal to the base portion (i.e., angular displacement θ≈0°).

$$\tau_{hinge} = \Sigma_1^n \tau_i \geq \tau_{lid} \quad \text{Eq (1)}.$$

It should be noted that the hinge assembly can include a constant torque component, such as a friction clip, that engages the shaft with frictional force $F_f$ applied at a surface of the shaft a distance $r_s$ from the axis of rotation resulting in constant torque $\tau_{const}$ according to Equation (2):

$$\tau_{const} = F_f * r_s \quad \text{Eq. (2)}.$$

Moreover, the hinge assembly can also include a variable torque component such as a torsional element that provides a torque in accordance with the angular displacement (θ) of the base that can provide variable torque $\tau_{var}$ in accordance with Equation (3):

$$\tau_{var} \propto \varphi \quad \text{Eq. (3)}$$

where φ represents a twist angle from an equilibrium position. In this way, by combining the various torque components, the hinge assembly can be customized to provide a torque profile in accordance with the specific design and kinematic requirements of the laptop computer.

In a particular case, presuming that the base has a uniform distribution of mass and a well-defined shape (in this case rectangular), base torque $\tau_{lid}$ can be related to the weight W of the base having length L in accordance to Equation (4), where weight W is taken as a point force acting through the center of mass of the base located at midpoint L/2.

$$\tau_{lid} = W * L / 2 \quad \text{Eq. (4)}.$$

Accordingly, as required by Eq. (1), hinge torque $\tau_{hinge}$ can be characterized as Equation (5):

$$\tau_{hinge} \geq W * L / 2 \quad \text{Eq. (5)}.$$

However, in the closed configuration, the base can be secured to the base portion by a securing force at a position near an edge away from the hinge assembly that offsets hinge torque $\tau_{hinge}$. In this way, by securing the base to the base portion, the base can remain in the closed configuration with respect to the base portion preventing inadvertent openings. In other words, the hinge assembly can be considered to be at a location x=0, then the base is secured to the base portion at location x=L, where L is the length of the base. Herein lies the problem, since the base is now constrained at x=L, the torque provided by the hinge assembly creates a bending moment (the base can be analogized as a beam) resulting in internal forces that result in a non-trivial bending of the base (that can also affect the base portion) causing bending thereof. It is this bending of the base (as well as any bending associated with the base portion) that results in a non-uniform gap between the base and the base portion in the secured and closed configuration.

In order to ameliorate this problem, a torque component coupling unit can be used to selectively couple and/or decouple a torque component. In one embodiment, the torque component coupling unit can selectively couple and/or decouple the base from the torque component(s) in the hinge assembly. In particular, the torque component coupling unit can allow the base to move with or without an applied torque relative to the base portion. By decoupling the torque components from the base, hinge torque $\tau_{hinge}$ is rendered null with respect to the base thereby removing any associated bending moments and reducing/eliminating associated internal stresses in the base. In this way, the base (and base portion) can relax and take on a shape consistent with a nominal geometry providing a consistent and uniform gap between the base and the base portion in the secured and closed configuration.

In one implementation, the torque component coupling unit can cooperate with the hinge assembly such that the base and the torque components can be selectively decoupled/coupled using a switchable magnetic assembly. The switchable magnetic assembly can provide a magnetic field having magnetic field properties based upon the angular displacement between the base and the base portion. For example, when it is determined that angular displacement θ lies within a first range corresponding to the open configuration, the switchable magnetic assembly can provide a first magnetic field having a magnetic field strength that can magnetically attract a magnetically attractable element attached to the base with a first latching force (that can be on the order of about 230 milli-Newton*meters). In this way, the torque components in the hinge assembly can act to apply the appropriate torque to maintain the relative position of the base and the base portion.

Moreover, when it is determined that angular displacement θ lies within a second range corresponding to the closed configuration, the switchable magnetic assembly can provide a second magnetic field having a magnetic field strength that can magnetically attract the magnetically attractable element with a second latching force (that can be on the order of about 160 milli-Newton*meters) that is less than the first latching force. In this situation, the second latching force is insufficient to maintain a physical coupling between the base and the torque components effectively eliminating hinge torque $\tau_{hinge}$.

In one embodiment, the switchable magnetic assembly can have magnets that form magnetic circuits corresponding to a range of angular displacement between the base and the base portion. For example, the switchable magnetic assembly can form a first magnetic circuit corresponding to a first range of angular displacement and a second magnetic circuit corresponding to a second range of angular displacement. In one embodiment, the first range of angular displacement can correspond to the open configuration and the second range of angular displacement can correspond to the closed configuration. The switchable magnetic assembly can include at least a permanent magnet and an electromagnet that can be used to alter the magnetic circuit. A sensor (or sensors) can be used to determine the relative position of the base and the base portion. A linear displacement type sensor can provide an indication of the proximity of the base to the base portion whereas an angular displacement type sensor can provide an indication of the angular displacement between the base and the base portion. In any case, the sensor can provide information that can be used to alter the magnetic circuit that, in turn, can result in disengaging/engaging any or all torque components with the base.

It should be noted that in addition to the angular displacement, an indication of the angular velocity (ω) can also be useful. For example, when it is determined that the angular displacement θ lies within a range corresponding to the closed configuration, the angular velocity ω can provide an indication that the base is moving towards the base portion (i.e., closing) or, conversely, moving away from the base (i.e., opening). For example, when it is determined that the angular displacement θ is within the range of angular displacement corresponding to the closed configuration and the angular velocity ω indicates that the base is being opened, then the switchable magnetic assembly can provide a magnetic circuit that re-engages all or some of the torque components with the base. In this way, the hinge assembly can facilitate a change in angular displacement θ between the base and the base portion as the lid is being rotated away from the base portion making it easier to open. It should be noted, that in some embodiments, an orientation sensor can be used to determine an overall orientation of the laptop computer with respect to vertical or horizontal. Accordingly, when the orientation sensor indicates that the laptop computer is vertical or near vertical, the torque component coupling unit can cause the torque components and base to remain engaged when the laptop computer is in the closed configuration. In this way, an inadvertent separation of the base and the base portion can be avoided.

These and other embodiments are discussed below with reference to FIGS. 1-11. However, those skilled in the art will readily appreciate that the detailed description given herein with respect to these Figures is for explanatory purposes only and should not be construed as limiting.

FIG. 1 illustrates an isometric view of an embodiment of an electronic device 100 in an open configuration, in accordance with the described embodiments. The "open configuration" can be associated with a configuration that allows a user of the electronic device 100 to interact with the electronic device 100. In particular, the open configuration can be characterized as having an angular displacement θ being the angle between the base and base portion ranging from 180° (or π radians) in a fully open configuration or 90° (or $\frac{\pi}{2}$ radians) when the base is in a vertical orientation with respect to the base portion. The electronic device 100 can include a laptop computer device. The electronic device 100 can include an enclosure 102. In some embodiments, the enclosure 102 is formed from plastic. In the embodiment shown in FIG. 1, the enclosure 102 is formed from a metal, which can include aluminum or aluminum alloy. However, other metals or metal alloys are possible. The enclosure 102 can include a base 104 secured with a base portion 106. The base 104 can be capable of rotational movement with respect to the base portion 106, and vice versa.

The base 104 can include several features suitable for use with the electronic device 100. For example, the base 104 can include a display assembly 108 in electrical communication with one or more processor circuits (not shown), which can be disposed in the base 104 and/or the base portion 106. The display assembly 108 can be designed to present visual information, which can include textual information and/or image information including still images or video. The base portion 106 can include several features designed to input a command to one or more processor circuits (not shown) disposed in the base portion 106 and/or the base 104. For example, the base portion 106 can include a keyboard assembly 110 that includes several depressible keys for use by a user of the electronic device 100. The base portion 106 can further include a touch pad 112 designed to input a command in the form of a gesture.

Figure 2:
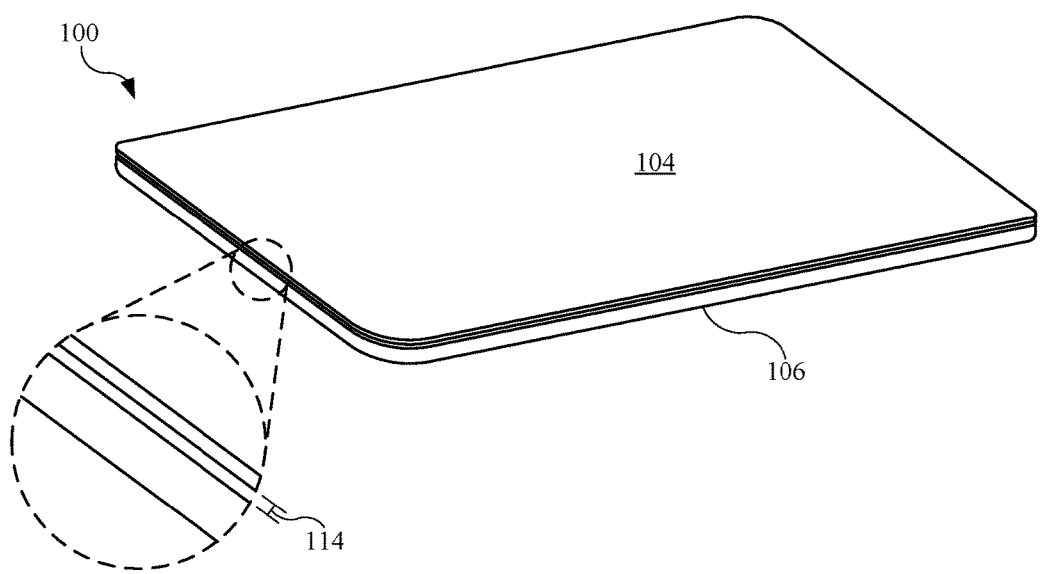
FIG. 2 illustrates an isometric view of the electronic device shown in FIG. 1, showing the electronic device in a closed configuration.

FIG. 2 illustrates an isometric view of the electronic device 100 shown in FIG. 1, showing the electronic device in a closed configuration. The "closed configuration" can be associated with a configuration in which the user is not actively using a tactile input device (such as a keyboard) of the electronic device 100. For example, as shown, the closed configuration can include the base 104 proximate to the base portion 106. This can facilitate transporting the electronic device 100. Further, as shown in the enlarged view, the base 104 can be separated from the base portion 106 by a gap 114, defined as a space between the base 104 and the base portion 106. The electronic device 100 can be designed such that when the electronic device 100 is in the closed configuration, the gap 114 is consistent (or approximately consistent) between the base 104 and the base portion 106. It should be noted that the closed configuration can be defined by a relative position between base portion 106 and base 104. For example, the closed configuration can be defined as an angular displacement between the base portion 106 and the base 104. More particularly, the closed configuration can correspond to angular displacement θ (in degrees or radians) between base portion 106 and base 104 having a value within a range consistent with θ1≤θ≤θ2, having in one embodiment, θ1≅0° and θ2 can be on the order of a few degrees (about 5°, for example). In other words, the range of angular displacement consistent with the closed configuration can be within a few degrees of 0°. The range of angular displacement θ can, of course, vary in accordance with particular design and/or kinematic requirements as well as any convention deemed appropriate. For example, referring back to FIG. 1, in the open configuration, the angular displacement θ between base 104 and base portion 106 is on the order of about 90° or $\frac{\pi}{2}$ radians (i.e., base 104 is essentially perpendicular to base portion 106) representing an equilibrium position where little or no torque is required to maintain the relative position of base 104 and base portion 106.

Figure 3:
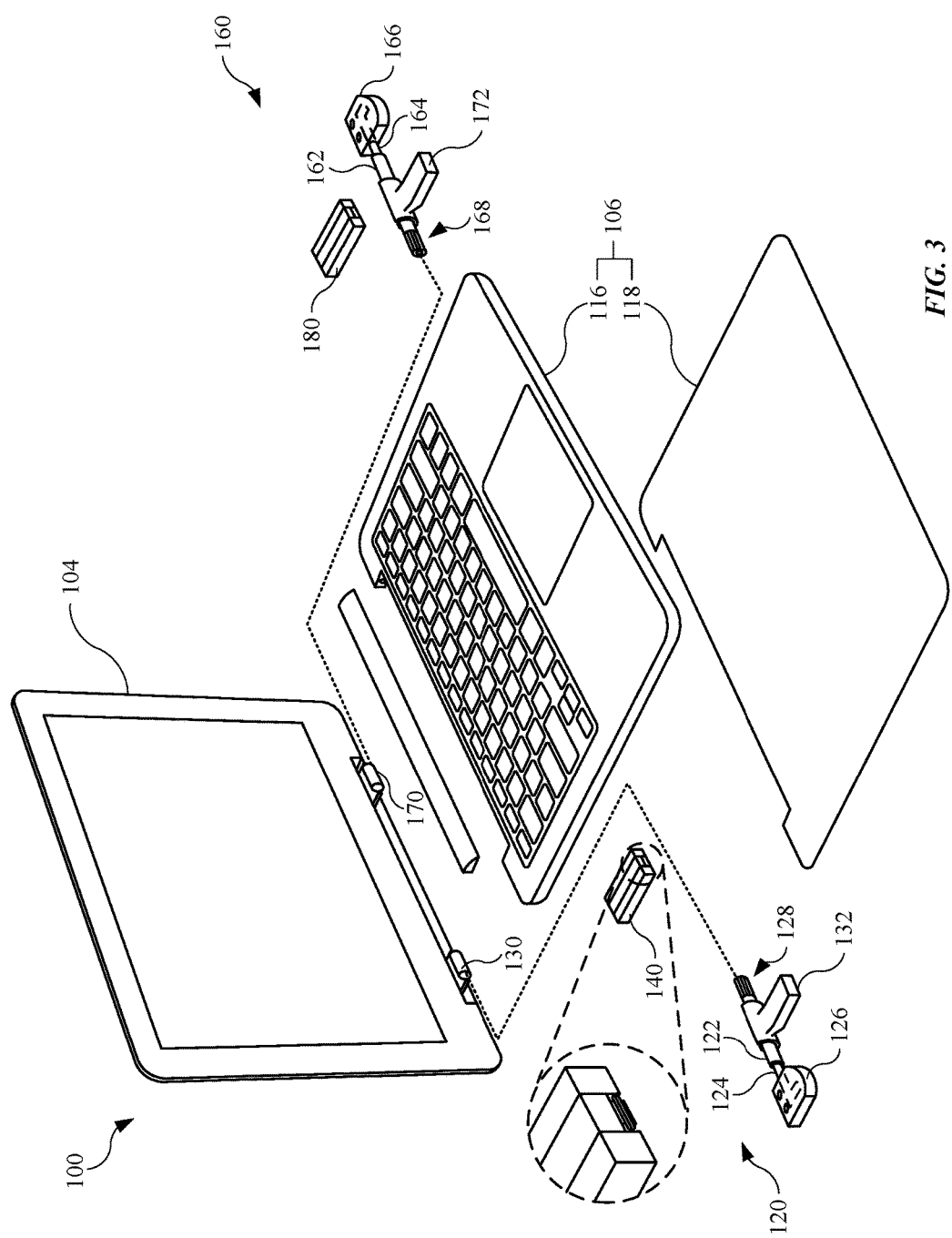
FIG. 3 illustrates an exploded view of the electronic device shown in FIGS. 1 and 2.

FIG. 3 illustrates an exploded view of the electronic device shown in FIGS. 1 and 2. As shown, the base portion 106 can include a top case 116 and a bottom case 118 designed to secure with the top case 116 to enclosure several internal components (not shown for purposes of simplicity). Also, although not shown, the top case 116 and the bottom case 118 can be secured together by, for example, fasteners (including threaded screws), rivets, mechanical clips, and/or magnets.

The electronic device 100 can include several structural features that allow the electronic device 100 to move from the open configuration to the closed configuration, and vice versa. For example, the electronic device 100 can include within base portion 106, a first hinge assembly 120 and a second hinge assembly 160. In some instances, the structural features and associated details will be described for the first hinge assembly 120. However, it will be appreciated that the second hinge assembly 160 can include any features or details shown and described for the first hinge assembly 120. As noted above, either or both the first hinge assembly 120 and the second hinge assembly 160 can have a shaft that defines an axis of rotation about which the base 104 can move with respect to the base portion 106. It should be noted that either or both of the hinge assemblies can provide a constant and/or variable torque depending on specific kinematics and user considerations. For example, the particular kinematics of the electronic device 100 can require that the base 104 retain a fixed position, or angular displacement, relative to the base portion 106 in an open configuration in order to maintain user input accessibility. Accordingly, in order to maintain the fixed relative position, either or both hinge assemblies can provide an overall hinge assembly torque that can balance a torque generated by the base 104 and/or the base portion 106 in the open configuration. In other words, the torque generated by the base 104 when positioned within the range of angular displacement θ corresponding to the open configuration can be offset by the torque provided by either or both of the hinge assemblies. It should be noted, that in those situations where a variable torque component is present that provides a torque consistent with a deviation from an equilibrium position (such as when θ≈90° corresponding to an upright, or vertical, position of the base 104 when the base portion 106 is supported on a horizontal surface), the variable torque provided by the torsional element can be approximately null in that a corresponding twist angle φ associated with the torsional element can be about zero.

As shown, the first hinge assembly 120 and the second hinge assembly 160 can include a first shaft 122 and a second shaft 162, respectively. Both the first shaft 122 and the second shaft 162 can include an opening or cavity to receive a first torque element 124. Torque element 124 can take on many forms such as a variable torque element along the lines of a torsional spring or a constant torque element along the lines of a friction clip. In the context of this discussion, the torque elements of first hinge assembly 120 and second hinge assembly 160 can take the form of a variable torque element embodied as first torsional element 124 and second torsional element 164, respectively. For example, the first torsional element 124 can extend through of an opening of the first shaft 122. It will be appreciated that the second shaft 162 and the second torsional element 164 include a substantially similar configuration. Also, an end region of the torsional elements can be secured and fixed with an end of their respective shafts, by for example, crimping the end regions of the shafts to the torsions springs, or soldering, a combination of both. At an opposing end, the first torsional element 124 and the second torsional element 164 can generally include an L-shaped design that extends beyond their respective shafts. In this regard, the electronic device 100 can also include a first base mount 126 and a second base mount 166, each of which can be designed to receive the L-shaped, or angled, region of the first torsional element 124 and the second torsional element 164, respectively. The first base mount 126 and the second base mount 166 can be secured within the base portion 106, and in some cases, can secure with the top case 116. Accordingly, the first torsional element 124 and the second torsional element 164 can be coupled with the base portion 106 by the first base mount 126 and the second base mount 166, respectively. However, in some embodiments, the first base mount 126 and the second base mount 166 are designed to secure with the bottom case 118. It should be noted that the first shaft 122 and the second shaft 162 can include a first spline region 128 and a second spline region 168, respectively. The first spline region 128 and the second spline region 168 are designed to couple with a first display mount 130 and a second display mount 170, respectively, of the base 104. In this regard, both the first display mount 130 and the second display mount 170 can include a corresponding spline region (not shown) having a corresponding size and shape as that of the first spline region 128 and the second spline region 168, respectively.

In the embodiment shown and described, the first hinge assembly 120 and the second hinge assembly 160 can include a first torque component engagement feature 132 and a second torque component engagement feature 172. As shown, both the first torque component engagement feature 132 and the second torque component engagement feature 172 include a rounded opening designed to receive and engage the first shaft 122 and the second shaft 162, respectively (in a location other than the spline regions of the first shaft 122 and the second shaft 162). Both the first torque component engagement feature 132 and the second torque component engagement feature 172 can include a magnet and/or a magnetically attractable metal.

The first torsional element 124 and the second torsional element 164 are designed to twist in response to a rotational force and as such provide a variable torque that can be used to maintain base 104 in an open configuration with respect to base portion 106. For example, a rotational (or angular) displacement of the base 104, caused by the rotation of the base 104 with respect to the base portion 106 from the open configuration (shown in FIG. 1) to a position that can include a closed configuration (shown in FIG. 2), can cause the first shaft 122 and the second shaft 162 to rotate in such a way as to provide an angular displacement θ. The angular displacement θ, in turn, can cause the first torsional element 124 and the second torsional element 164 to rotate from an equilibrium position (in this case vertical) by a twist angle φ providing variable torque $\tau_{var}$ as per Eq, (3). Accordingly, the external force applied to the base 104 (or the base portion 106) can cause the first torsional element 124 and the second torsional element 164 to transfer rotational energy (proportional to $\phi^2$) to the base 104. In other words, the greater the base 104 is rotated from equilibrium $$(\theta \cong \frac{\pi}{2}; \varphi \cong 0),$$

the corresponding twist angle φ results in the first torsional element 124 and the second torsional element 164 providing variable torque $\tau_{var}$ sufficient to overcome the base torque $\tau_{lid}$ generated by the base 104 (per Eq. (4)). It should be noted that as long as the base 104 and the base portion 106 remain unsecured and apart, any bending is transitory and will not be particularly noticeable. However, when base 104 and base portion 106 are secured to each other in a secured and closed configuration, the base 104 (and the base portion 106) can be analogized to a beam having a torque $\tau_{var}$ applied at one end and fully constrained at another, opposite, end. In this way, the torque $\tau_{var}$ causes a bending moment in the base 104 (and/or the base portion 106) resulting in uncompensated shear forces that cause the base 104 (and/or the base portion 106) to deform and take on a shape that deviates from nominal. For example, when the base 104 is secured to the base portion 106, the bending of the base 104 can result in a non-uniform gap between the base portion 106 and the base 104.

A torque component coupling unit can be used to selectively remove or disengage the torque provided by the hinge assembly from the base. In one embodiment, the torque component coupling unit (or de-coupler) can selectively couple and decouple the base from any or all of the torque components in the hinge assembly. In particular, the torque component coupling unit can allow the base to move with or without the hinge torque $\tau_{hinge}$ relative to the base portion. By decoupling the torque components from the base, the hinge torque $\tau_{hinge}$ with respect to the base is rendered null thereby eliminating any associated bending moments and corresponding internal stresses. In this way, the base (and base portion) can relax and take on a shape consistent with a nominal geometry resulting a consistent and uniform gap between the base and the base portion.

In this regard, both the first hinge assembly 120 and the second hinge assembly 160 can further include a first magnetic assembly 140 and a second magnetic assembly 180, respectively. An enlarged view of the first magnetic assembly 140 shows the first magnetic assembly 140 having multiple magnets. In the example shown below, either or both of the first and second magnetic assemblies take the form of an electro-permanent magnet. More particularly, the first magnetic assembly 140 can include two magnetic elements in which a first magnetic element is a permanent magnet having a first polarity and a second magnetic element is an electromagnet that can be reversibly switched from the first polarity to a second (opposite) polarity. In this way, the first magnetic assembly 140 can form a first magnetic circuit that attracts the first torque component engagement feature 132 with a first latching force. However, by switching the polarity of the second magnetic element, the first magnetic assembly 140 can form a second magnetic circuit that can attract the first torque component engagement feature 132 with a second latching force less than the first latching force. In one implementation, the first latching force can be on the order of about 230 milli-Newton*meters whereas the second latching force can be on the order of 160 milli-Newton*meters that can result in the first magnetic assembly 140 disengaging from and releasing the first torque component engagement feature 132.

In one embodiment, the first magnet can be formed of high coercivity material (such as Neodymium) and the second magnet can be an electromagnet having a polarity that can be changed in accordance with an applied current. In the described embodiment, the first magnetic assembly 140 and the second magnetic assembly 180 can be disposed in the base portion 106 between the top case 116 and the bottom case 118. Further, the first magnetic assembly 140 and the second magnetic assembly 180 can be secured with the top case 116 such that the first magnetic assembly 140 and the second magnetic assembly 180 can magnetically couple with the first torque component engagement feature 132 and the second torque component engagement feature 172, respectively. The structural features of the first magnetic assembly 140 will be described below.

When assembled, the electronic device 100 can be designed to allow the base 104 to rotate with respect to the base portion 106, due in part to the first hinge assembly 120 and the second hinge assembly 160. Further, the first torque component engagement feature 132 and the second torque component engagement feature 172 can frictionally engage or torsionally engage the first shaft 122 and the second shaft 162, respectively, to maintain the electronic device 100 in the open configuration (shown in FIG. 1), and in particular, to hold the base 104 in a fixed position with respect to base portion 106. As the electronic device 100 changes to the closed configuration (shown in FIG. 2), the base 104 can rotate in a direction toward the base portion 106. This can cause the first shaft 122 and the second shaft 162 to rotate, and the first torsional element 124 and the second torsional element 164 can twist in a manner previously described. Also, the first torque component engagement feature 132 and the second torque component engagement feature 172 allow rotation of the first shaft 122 and the second shaft 162, respectively. Further, in order to move the base 104 from the open to the closed configuration, a closing force that is greater than a frictional force provided by the first hinge assembly 120 and the second hinge assembly 160 is applied to base 104. The closing force causes base 104 to rotate about a axis of rotation defined by the first shaft 122 causing the base 104 to bend and as a result, mechanical energy can be stored in base 104 (much like energy stored in a spring). In one embodiment, prior to the base 104 reaching the closed configuration (shown in FIG. 2), torque components in both the first magnetic assembly 140 and the second magnetic assembly 180 can be disengaged from the base 104. For example, first magnetic assembly 140 and the second magnetic assembly 180 can physically disengage with their respective torque component engagement features. The physical disengagement can allow base 104 to rotate in such a way that any bending moments associated with base 104 can be eliminated having the effect of relaxing the base 104 thereby reducing any non-uniformities of the gap between base 104 and base portion 106 when the base 104 is secured to the base portion 106.

It should be noted that in the described embodiment, the electronic device 100 can include a sensor that can detect the relative position between the base 104 and the base portion 106. In one implementation, the sensor can provide an indication of the angular displacement that can, on turn, be used to determine whether the electronic device 100 is in the closed or the open configuration. The sensor (or an additional sensor) can also be used to determine an angular velocity (being the derivative of the angular displacement). The angular velocity can be used to determine if the base 104 is moving away from the base portion 106 (consistent with an act of opening) or moving towards the base portion 106 (consistent with an act of closing). In this way, a torque coupling unit can be used to couple the heretofore de-coupled torque component, and the torque provided by the torque component can assist in the act of opening thereby improving the overall user experience.

Figure 4:
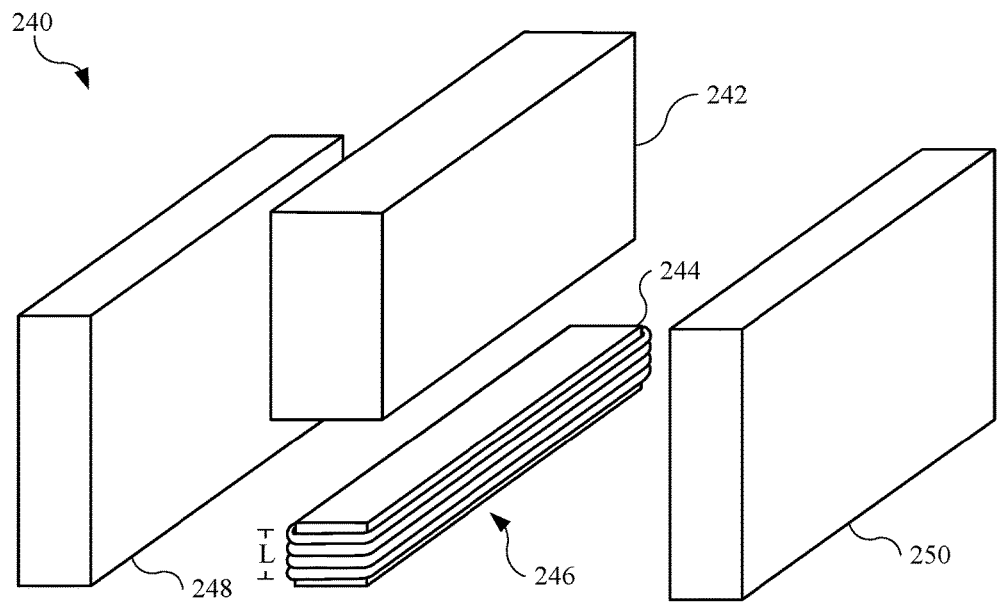
FIG. 4 illustrates an isometric view of an embodiment of a magnetic assembly, in accordance with the described embodiments.

FIG. 4 illustrates an isometric view of an embodiment of a magnetic assembly 240, in accordance with the described embodiments. In some embodiments, the structural features shown and described for the magnetic assembly 240 can be used for the first magnetic assembly 140 and/or the second magnetic assembly 180 (shown in FIG. 3). The magnetic assembly 240 can include a first magnet 242 and a second magnet 244. In one embodiment, the magnetic assembly 240 can include an electromagnet. For example, as shown, the magnetic assembly 240 includes a wire coil 246 wrapped about at least a portion of the second magnet 244. The wire coil 246 forms an electromagnet having magnetic properties that can be altered in accordance with a direction and magnitude of electrical current carried by wire coil 246 and the intrinsic properties of second magnet 244. The magnetic assembly 240 can include a first plate 248 and a second plate 250. The first plate 248 and the second plate 250 can magnetically couple with the first magnet 242 and the second magnet 244. The first plate 248 and the second plate 250 can be formed from a material that is conducive to formation of a magnetic circuit. Such materials include but are not limited to ferromagnetic metal. In this regard, a magnetic circuit can be formed that passes through at least the first plate 248 and the second plate 250.

In some embodiments, the first magnet 242 is a permanent magnet, and can be formed of neodymium or alnico. However, other types of magnetic material (or materials) are possible. In some embodiments, the second magnet 244 is a permanent magnet. However, the material selected for the second magnet 244 can be formed of material having a coercivity lower than that of the first magnet 242. In other words, both the first magnet 242 and the second magnet 244 can be permanent magnets, but the second magnet 244 can be characterized as having a lower ability to resist or withstand a change of magnetic property, such as magnetic polarity, as compared to the first magnet 242. In this regard, the magnetic assembly 240 can be designed to alter an ability to magnetically attract a magnetically attractable element such as a corresponding torque component engagement feature. This alteration can be achieved by altering a magnetic circuit formed by the first magnet 242 and the second magnet 244. For example, when the magnetic polarities of the first magnet 242 and the second magnet 244 are aligned, then magnetic field lines corresponding to the magnetic circuit formed will extend through and away from the first plate 248 and the second plate 250 creating a relatively strong magnetic attraction with the corresponding torque component engagement feature. Conversely, by changing the magnetic polarity of one of the magnets such that the magnetic polarities are not aligned, some of the magnetic field lines of the magnetic circuit formed are contained within the first plate 248 and the second plate 250 having the effect of a reduced number of field lines extending away from magnetic assembly 240 resulting in a reduced magnetic attraction with the corresponding torque component engagement feature.

Figure 5:
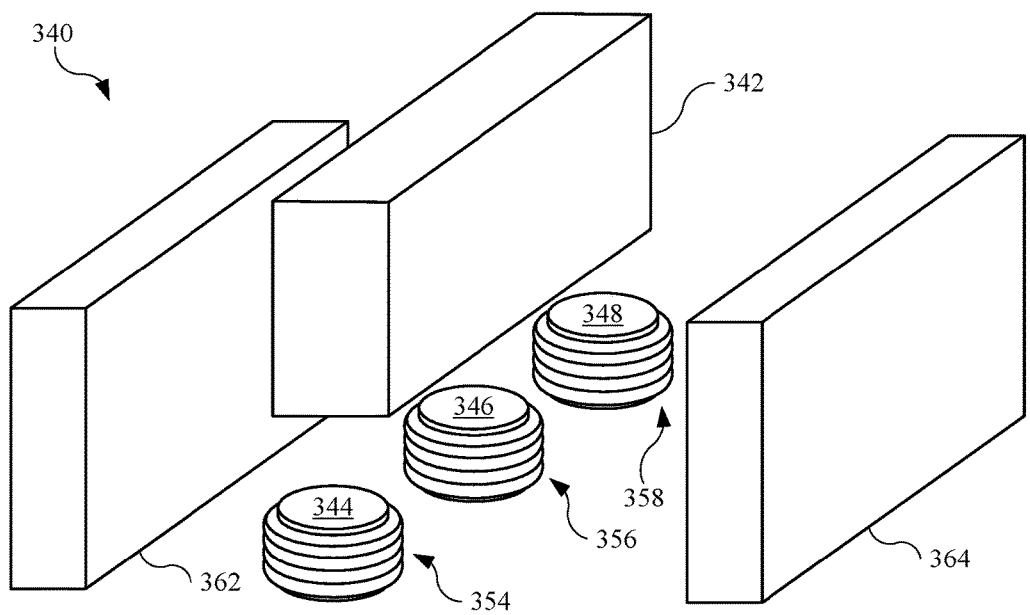
FIG. 5 illustrates an isometric view of an alternate embodiment of a magnetic assembly, in accordance with the described embodiments.

In accordance with the described embodiments, magnetic assemblies can include different sizes and shapes, as well as a different number of magnets. FIG. 5 illustrates an isometric view of an alternate embodiment of a magnetic assembly 340, in accordance with the described embodiments. As shown, the magnetic assembly 340 can include additional magnets, such as a first magnet 342, a second magnet 344, and a third magnet 346, and a fourth magnet 348. These magnets can include any material previously described for a magnet. As shown, the second magnet 344, the third magnet 346, and the fourth magnet 348 can include a first wire coil 354, a second wire coil 356, and a third wire coil 358, respectively, with each wire coil electrically coupled with a power source (not shown) such that the first wire coil 354, the second wire coil 356, and the third wire coil 358 can receive electrical current to form respective electromagnets in a manner previously described. In this regard, the magnetic assembly 340, and in particular the second magnet 344, the third magnet 346, and the fourth magnet 348, can be designed to alter a magnetic polarity in accordance with current carried by the first wire coil 354, the second wire coil 356, and the third wire coil 358. The alteration of the magnetic polarities (and potentially magnetic field strength) can alter a magnetic circuit formed by the magnetic assembly 340.

Also, the magnetic assembly 340 can include a first plate 362 and a second plate 364. The first plate 362 can combine with the second plate 364 to cooperate with the first magnet 342, the second magnet 344, the third magnet 346, and the fourth magnet 348 to form the magnetic circuit. The first plate 362 and the second plate 364 can be formed from any material previously described for a plate (for example, the plates shown in FIG. 4). When the magnetic field of the second magnet 344, the third magnet 346, and the forth magnet 348 combine to align with that of the first magnet 342, then the magnetic circuit can be characterized as having magnetic field lines that are carried within the first plate 362 and the second plate 364 and that extend outwardly therefrom having the potential of magnetically attracting a magnetically attractive element with a first magnetic attraction force. However, by altering the current carried by the first wire coil 354, the second wire coil 356, and the third wire coil 358, the magnetic polarities can become anti-aligned with that of the first magnet 342 resulting in an altered magnetic circuit whereby some of the magnetic field lines remain within the plate 362 and the second plate 364, and as a result, fewer magnetic field lines extend a lesser distance away therefrom resulting in a second magnetic attraction force that is less than the first magnetic attraction force. By providing a switchable external magnetic field, the magnetic assembly 340 is well suited for selective decoupling parts such as the base 104 and mechanical elements that resist the rotation of the base 104.

FIGS. 6-10 each illustrate an electronic device that includes a torque component engagement feature and a magnetic assembly, in accordance with the described embodiments. Further, FIGS. 6-10 each illustrate the electronic device changing from an open configuration to a closed configuration, while also showing the torque component engagement feature interacting with the magnetic assembly. It will be appreciated that the electronic device shown in FIGS. 6-10 can include any components and/or features previously described for an electronic device.

Figure 6:
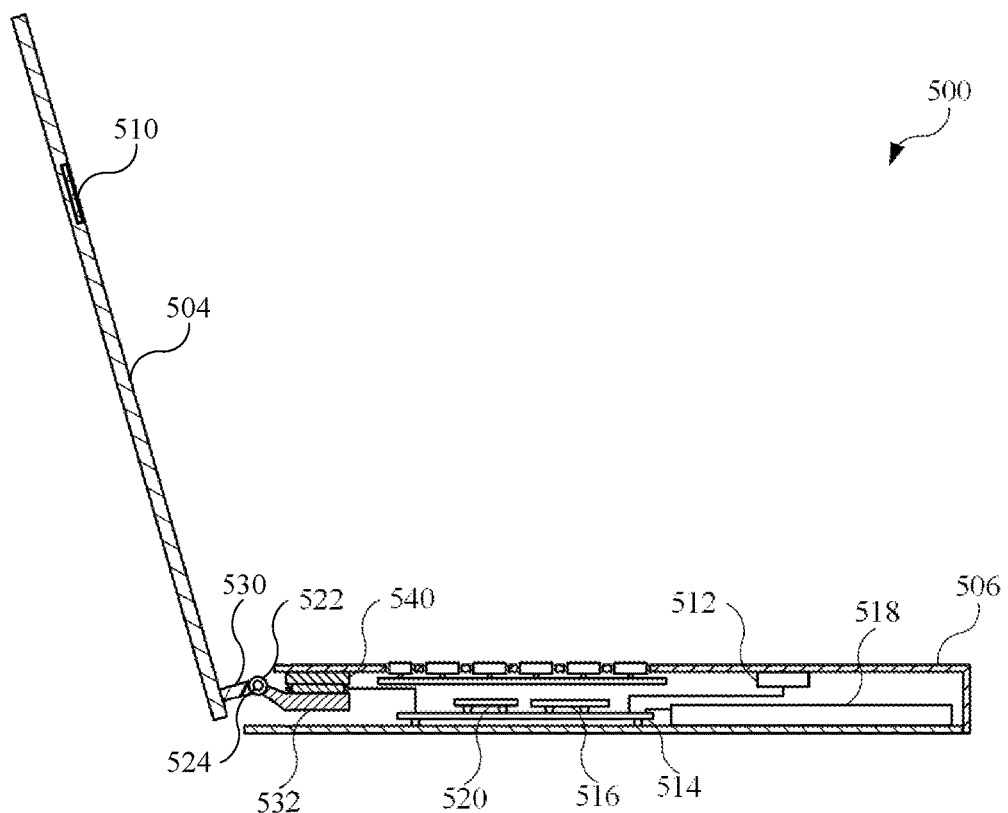
FIG. 6 illustrates a partial cross sectional view of an electronic device in an open configuration, in accordance with the described embodiments.

FIG. 6 illustrates a partial cross sectional view of an electronic device 500 in an open configuration, in accordance with the described embodiments. The electronic device 500 can include a torque component engagement feature 532 magnetically coupled with a magnetic assembly 540 by a magnetic circuit formed by the magnetic assembly 540 and passing through the torque component engagement feature 532. Although not shown, the magnetic assembly 540 can include several magnets, including at least one magnet surrounded by a wire coil, with the wire coil designed to receive electrical current to form an electromagnet. The torque component engagement feature 532 can couple a base 504 with a base portion 506 by way of a display mount 530 and a shaft 522. The torque component engagement feature 532 can frictionally engage the shaft 522 to maintain the base 504 in a fixed position relative to the base portion 506. However, when a force (provided by, for example, a user of the electronic device 500) is applied to the base 504 that overcomes the frictional forces provided by the torque component engagement feature 532, the base 504 can rotate relative to the base portion 506. When the force is removed, the base 504 can be positioned in a different fixed location based relative to the base portion 506. The shaft 522 can include a torsional element 524 designed to twist or rotate in response to rotation of the base 504 in a manner previously described. Also, although not shown, the electronic device 500 can include multiple shafts, display mounts, and torque component engagement features, similar to the embodiment of the electronic device 100 (shown in FIG. 3). In other words, the electronic device 500 can include at least two hinge assemblies (similar to FIG. 3) that function in a similar manner.

The electronic device 500 can include additional components. For example, the electronic device 500 can include a magnet 510 disposed in the base 504 and hidden from view. Also, the electronic device 500 can include a magnetic field sensor 512 disposed in the base portion 506. Further, the magnetic field sensor 512 can be positioned to detect an external magnetic field (not shown) of the magnet 510 in certain orientations of the electronic device 500. This will be shown below. Also, in some embodiments, the magnetic field sensor 512 is capable of determining an angle of the magnetic field of the magnet 510 relative to the magnetic field sensor 512. It should be noted that any change in the external magnetic field of magnet 510 can be analogized to an angular velocity indicative of electronic device 500 being opened or closed. This will be shown and discussed below.

The electronic device 500 can also include a circuit board 514 in electrical communication with the magnetic field sensor 512 and the magnetic assembly 540. The circuit board 514 can include a processor circuit 516 designed to process electrical signals received by the circuit board 514 and generate command (or commands) based in part on the electrical signals received. The electronic device 500 can also include an internal power supply 518 disposed in the base portion 506 and electrically coupled with the circuit board 514. Also, the magnetic assembly 540 can be electrically coupled with the internal power supply 518 such that a wire coil (not shown) can receive electrical current from the internal power supply 518 to change the magnetic field strength of the magnetic assembly 540 in a manner previously described for a magnetic assembly. In this regard, the magnetic assembly 540 can be referred to a variable magnetic assembly designed to reduce its magnetic attraction force.

The circuit board 514 can also include a memory circuit 520 designed to store one or more executable programs executed by the processor circuit 516. For example, the processor circuit 516 can be designed to execute a program from the memory circuit 520 and generate a command based on an electrical signal received from the magnetic field sensor 512. The command can cause electrical current to flow to the magnetic assembly 540, and in particular, around a wire coil (not shown) to form an electromagnet in a manner previously described, causing the magnetic field strength of the magnetic assembly 540 to decrease. This will be discussed further below.

Figure 7:
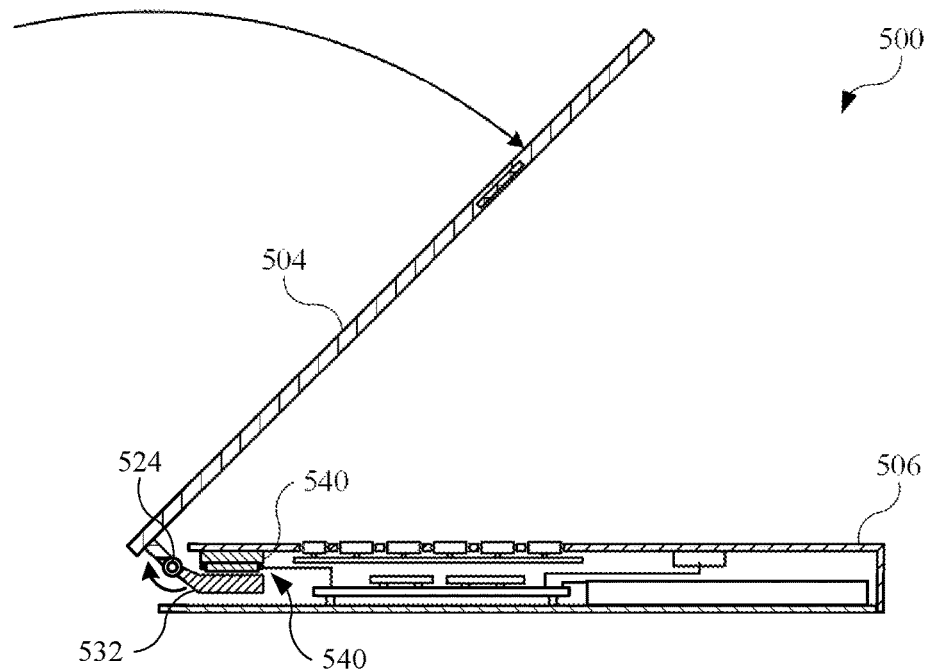
FIG. 7 illustrates a partial cross sectional view of the electronic device shown in FIG. 6, with the base rotated in a direction toward the base portion.

FIG. 7 illustrates a partial cross sectional view of the electronic device 500 shown in FIG. 6, with the base 504 rotated in a direction toward the base portion 506. A force can be applied by, for example, a user of the electronic device 500 to rotate the base 504. The torque component engagement feature 532 can remain frictionally engaged with the shaft 522, thereby allowing the base 504 to remain fixed in a position when the force to the base 504 is removed. Also, the torsional element 524 can rotate or twist, and accordingly, can provide a force, or retaining force, in a rotational direction opposite the rotational direction of base 504. At least some of the force from the torsional element 524 can be applied to the torque component engagement feature 532 and the base 504. However, despite the force of the torsional element 524, the magnetic circuit of magnetic assembly 540 can maintain the torque component engagement feature 532 magnetically coupled with the magnetic assembly 540, as shown.

Figure 8:
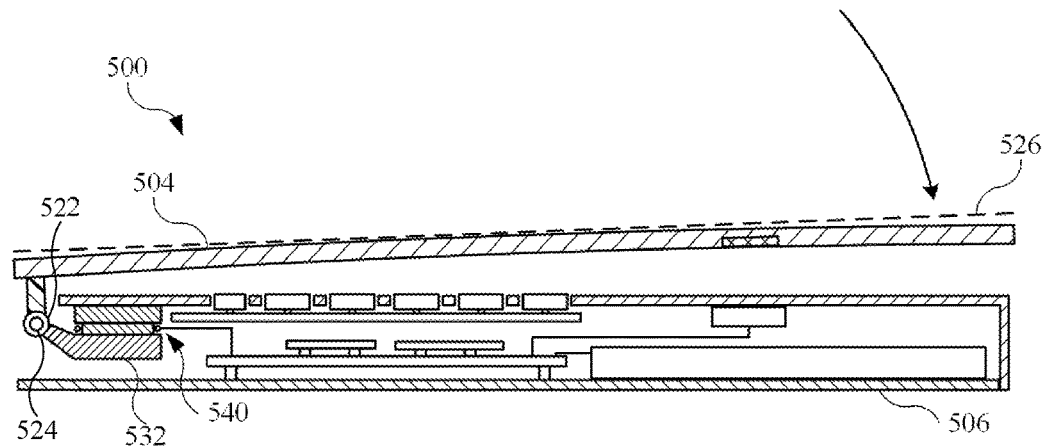
FIG. 8 illustrates a partial cross sectional view of the electronic device shown in FIG. 7, showing the base further rotated in a direction toward the base portion.
Figure 9:
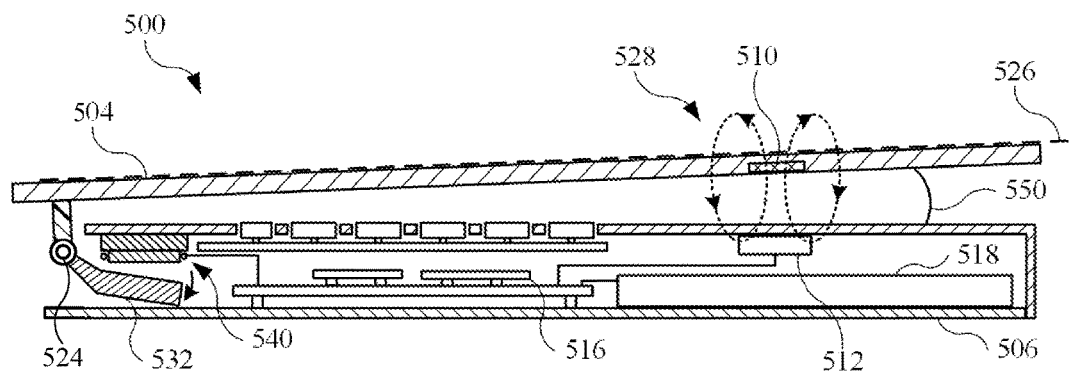
FIG. 9 illustrates a partial cross sectional view of the electronic device shown in FIG. 8, showing the torque component engagement feature magnetically decoupled from the magnetic assembly.

FIG. 8 illustrates a partial cross sectional view of the electronic device 500 shown in FIG. 7, showing the base 504 further rotated in a direction toward the base portion 506. When the base 504 is further rotated, the base 504 can begin to bend or warp. As shown, the base 504 can include a bent configuration (as compared to an imaginary straight line 526), due in part to a mechanical energy stored within the base 504 due to the force applied thereto. However, the electronic device 500 can offer a corrective action by relieving the base 504 of the force (or forces) that cause the base 504 to bend or warp. For example, FIG. 9 illustrates a partial cross sectional view of the electronic device 500 shown in FIG. 8, showing the torque component engagement feature 532 magnetically decoupled from the magnetic assembly 540. The torque component engagement feature 532 can magnetically decouple from the magnetic assembly 540 by the magnetic assembly 540 receiving an electrical current to form an electromagnet having a magnetic polarity opposite to that of at least one magnet of the magnetic assembly 540. In other words, the magnetic attraction force of the magnetic assembly 540 is reduced such that the magnetic circuit (of the magnetic assembly 540) no longer magnetically retains the torque component engagement feature 532. By decoupling the torque component engagement feature 532 from the magnetic assembly 540, a substantial amount of the stored mechanical energy can be relieved when the base 504 is secured to the base portion 106. As a result, the base 504 can return to a flat configuration. As shown, the base 504, in the flat configuration, is parallel (or at least approximately parallel) to the imaginary straight line 526.

The electronic device 500 can be designed to trigger the magnetically decoupling event between the torque component engagement feature 532 and the magnetic assembly 540 in multiple ways. For example, as shown in FIG. 9, the base 504 can be sufficiently rotated such that an external magnetic field 528 of the magnet 510 in the base 504 can be detected by the magnetic field sensor 512 in the base portion 506. The magnetic field sensor 512 can provide an electrical signal, or electrical input, to the processor circuit 516, and the processor circuit 516 can execute a command to provide electrical current (supplied by the internal power supply 518) to the magnetic assembly 540. This can cause the magnetic assembly 540 to reduce its effective magnetic field and lower its magnetic attraction force. As a result, the torque component engagement feature 532 can overcome the (reduced) magnetic field strength of the magnetic assembly 540, and decouple therefrom. Further, the force provided by the torsional element 524 can cause the torque component engagement feature 532 to overcome the reduced magnetic field strength of the magnetic assembly 540. Accordingly, the electronic device 500 can include a base 504 having a relatively small thickness and also provide means for maintaining the base 504 in a flat configuration.

Alternatively, the magnetic field sensor 512 can be designed to determine an angle of the external magnetic field 528 of the magnet 510 (relative to the magnetic field sensor 512, for example). The angle of the external magnetic field 528, detected by the magnetic field sensor 512, can cause the magnetic field sensor 512 to trigger an electrical signal that causes the magnetic assembly 540 to receive the electrical current to form an electromagnet that reduces the magnetic attraction force of the magnetic assembly 540. Alternatively, a trigger event reducing the magnetic attraction force of the magnetic assembly 540 can occur when the base portion 506 is positioned at (or below) a predetermined angle 550 with respect to the base portion 506.

Figure 10:
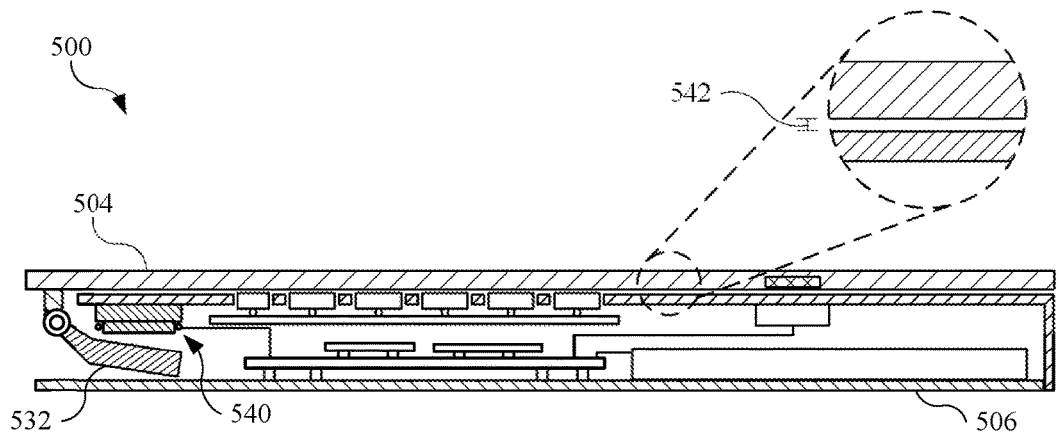
FIG. 10 illustrates a partial cross sectional view of the electronic device in the closed configuration, showing the base separated from the base portion by a gap.

FIG. 10 illustrates a partial cross sectional view of the electronic device 500 in the closed configuration, showing the base 504 separated from the base portion 506 by a gap 542, shown in the enlarged view. The gap 542 can be generally consistent throughout a location between the base 504 and the base portion 506. Also, in some embodiments, the trigger event to reduce the magnetic field strength of the magnetic assembly 540 to decouple the torque component engagement feature 532 from the magnetic assembly 540 can occur in the closed configuration of the electronic device 500. Also, in the closed configuration, the electrical current can be removed from the magnetic assembly 540. Moreover, the electrical current supplied to the wire coil can be provided by a pulse lasting a few milliseconds or less in order to switch the magnetic polarity of at least one of the magnets of the magnetic assembly 540. In some cases, a wire coil (not shown) of the magnetic assembly 540 can receive electrical current in the opposite direction forming an electromagnet with an opposite magnetic polarity to change the magnetic polarity of the magnet (or magnets) back to its initial polarity, thereby restoring the original (increased) magnetic attraction force of the magnetic assembly 540. This can cause the torque component engagement feature 532 to again magnetically couple with the magnetic assembly 540. However, in the closed configuration of the electronic device 500, the base 504 can remain in the flat configuration subsequent to the torque component engagement feature 532 returning to a magnetic coupling with the magnetic assembly 540.

Figure 11:
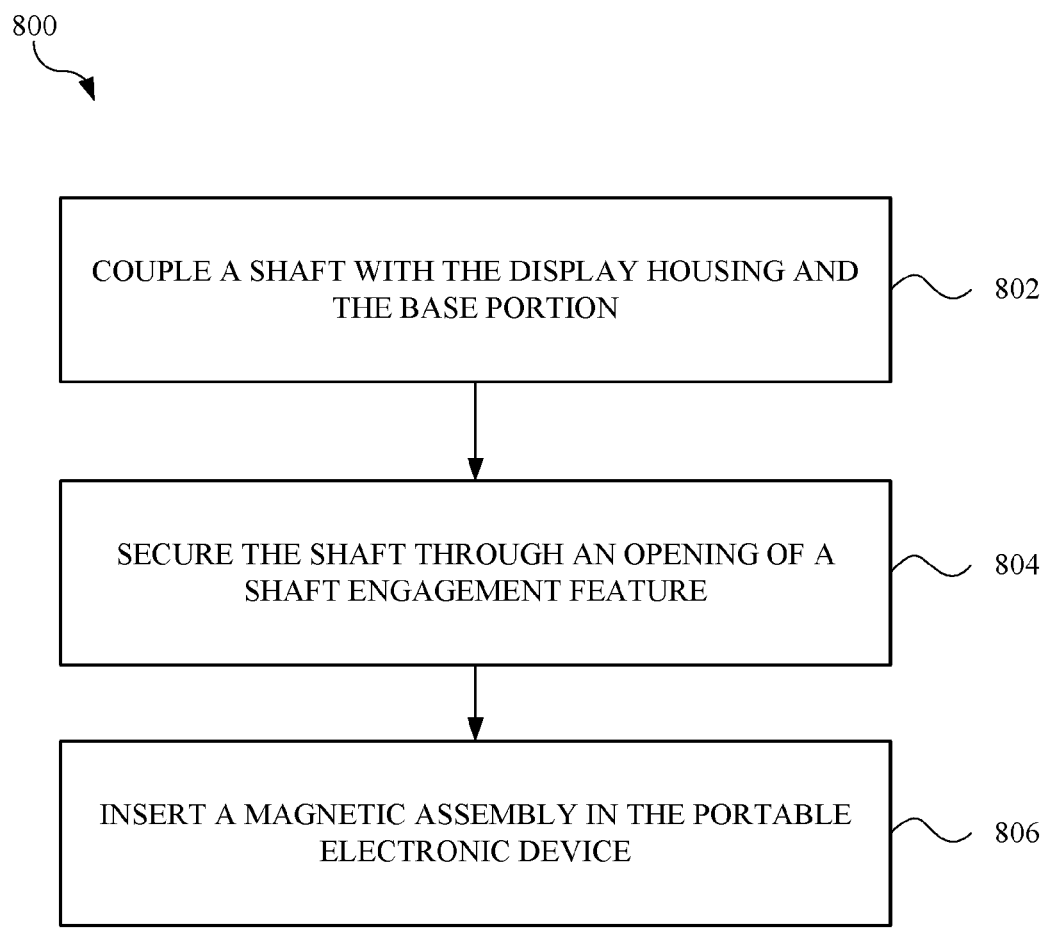
FIG. 11 illustrates a flowchart showing a method for assembling a portable electronic device having a base and a base portion, in accordance with the described embodiments.

FIG. 11 illustrates a flowchart 800 showing a method for assembling a portable electronic device having a base and a base portion, in accordance with the described embodiments. In step 802, a shaft is coupled with the base and the base portion. The shaft can include a torsional element extending through a cavity of the shaft. The torsional element can be configured to twist in response to a rotation of the shaft to define a twisted configuration of the torsional element. The shaft, the torque component engagement feature, and the torsional element can be part of one or more hinge assemblies in the portable electronic device.

In step 804, the shaft is secured through an opening of a torque component engagement feature. The shaft can allow rotation of the base with respect to the base portion, and vice versa. In step 806, a magnetic assembly is inserted in the portable electronic device. The magnetic assembly can include any structural component (or components) and any feature (or features) previously described for a magnetic assembly. The magnetic assembly can be configured to magnetically retain torque component engagement feature by a first magnetic field of the magnetic assembly in response to a force that rotates the base. Also, the magnetic assembly can further be capable of forming a second magnetic field different from the first magnetic field. The second magnetic field can allow the torque component engagement feature to decouple from the magnetic assembly in response to the force to the base and at least partially relieve from the torsional element from the twisted configuration.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A laptop having a base part rotatably coupled to a lid part, the laptop comprising:
   a sensor that is capable of detecting an angular displacement between the base part and the lid part and providing an angular displacement signal based upon the detecting;
   a torque element that is rotatably coupled to the lid part and that provides a torque to the lid part;
   a torque component engagement feature disposed between the torque element and the base part, and the torque component engagement feature capable of detachably coupling the torque element and the base part; and
   a magnetic assembly that magnetically engages the torque component engagement feature in accordance with the angular displacement such that (i) when the angular displacement is within a first range, the magnetic assembly provides a first magnetic field that causes the torque component engagement feature to couple with the base part, otherwise (ii) the magnetic assembly provides a second magnetic field that causes the torque component engagement feature and the base part to de-couple.

2. The laptop of claim 1, further comprising a shaft that couples the base part to the lid part, and the torque component engagement feature including an opening capable of receiving and frictionally engaging the shaft.

3. The laptop of claim 1, wherein the magnetic assembly includes an electro-permanent magnet that provides magnetic properties in accordance with the angular displacement between the base part and the lid part.

4. The laptop of claim 1, wherein when the angular displacement is within the first range, the magnetic assembly provides a first magnetic circuit that provides a first coupling force having a first magnitude that is capable of coupling the base part and the torque component engagement feature.

5. The laptop of claim 4, wherein when the angular displacement is not within the first range, the magnetic assembly provides a second magnetic circuit that provides a second coupling force having a second magnitude less than the first magnitude.

6. The laptop of claim 5, wherein the second magnitude is insufficient to maintain the coupling between the base part and the torque component engagement feature.

7. The laptop of claim 2, wherein the shaft includes a cavity and the torque element extends through the cavity.

8. The laptop of claim 1, wherein when the angular displacement is in the first range, the laptop is in an open configuration, and when the angular displacement is not within the first range, the laptop is in a closed configuration.

9. The laptop of claim 8, wherein when the angular displacement corresponds to the closed configuration and an angular velocity indicates that the base part is moving away from the lid part, then the magnetic assembly is capable of the torque component engagement feature to couple with the base part.

10. A portable electronic device having a base portion and a base, the portable electronic device comprising:
a shaft coupled with the base, the shaft comprising a cavity;
a torque element extending through the cavity and coupled with the base portion, the torque element configured to provide a torque in response to a rotation of the shaft, the rotation of the shaft caused by a rotation of the base with respect to the base portion;
a torque component engagement feature comprising an opening capable of receiving and frictionally engaging the shaft; and
a magnetic assembly that is capable of magnetically coupling with the torque component engagement feature based on a first magnetic field provided by the magnetic assembly, wherein the magnetic assembly is configured to provide a second magnetic field different from the first magnetic field thereby allowing the torque component engagement feature to magnetically decouple from the magnetic assembly.

11. The portable electronic device as in claim 10, wherein the torque element is a torsional element that provides a torque related to a twist angle associated with a twisted configuration of the torsional element, the twist angle being a difference between a current angular displacement of the base with respect to an equilibrium angular displacement.

12. The portable electronic device of claim 11, wherein:
the torsional element, when in the twisted configuration, provides a counterforce to the torque component engagement feature, and
the first magnetic field maintains the coupling between the magnetic assembly and the torque component engagement feature when the counterforce is provided to the torque component engagement feature, and
the counterforce causes the torque component engagement feature to decouple from the magnetic assembly under the second magnetic field.

13. The portable electronic device of claim 12, wherein the magnetic assembly includes:
a first magnet having a first polarity;
a second magnet having the first polarity; and
a wire coil surrounding the second magnet, and the wire coil configured to receive an electrical current such that:
(i) when the wire coil does not receive the electrical current, the first magnet and the second magnet each provide a magnetic field that interacts to form the first magnetic field, and
(ii) when the wire coil receives the electrical current, the second magnet is capable of switching to a second polarity opposite the first polarity such that the first magnet and the second magnet each provide a magnetic field that interacts to form the second magnetic field.

14. The portable electronic device of claim 13, wherein the first magnetic field is characterized as having a first magnetic strength and wherein the second magnetic field is characterized as having a second magnetic strength less than the first magnetic strength.

15. The portable electronic device of claim 10, wherein the magnetic assembly is secured with the base portion such that the torque component engagement feature is configured to move with respect to the magnetic assembly.

16. The portable electronic device of claim 10, further comprising:
a magnet that generates a magnetic field; and
a magnetic field sensor that detects the magnetic field, wherein the magnetic assembly is configured to provide the second magnetic field based upon a direction of the magnetic field determined by the magnetic field sensor.

17. The portable electronic device of claim 16, wherein the magnet is disposed in the base, and wherein the magnetic field sensor is disposed in the base portion.

18. A method for assembling a portable electronic device having a base and a base portion, the method comprising:
coupling a shaft with the base and the base portion, the shaft comprising a torsional element extending through a cavity of the shaft, the torsional element configured to provide a torque to the base in response to a rotation of the shaft;
securing the shaft through an opening of a torque component engagement feature; and
inserting a magnetic assembly in the portable electronic device, the magnetic assembly configured to magnetically couple the torque component engagement feature by a first magnetic field of the magnetic assembly in response to a force that rotates the base with respect to the base portion, and the magnetic assembly further capable of providing a second magnetic field different from the first magnetic field that allows the torque component engagement feature to decouple from the magnetic assembly in response to the force to the base and at least partially reduce the torque provided to the base by the torsional element.

19. The method of claim 18, wherein inserting the magnetic assembly in the portable electronic device comprises:
inserting a first magnet in the portable electronic device; and
inserting a second magnet in the portable electronic device, the first magnet having a polarity that is the same as a polarity of the second magnet; and
surrounding the second magnet with a wire coil configured to receive electrical current, wherein the first magnet and the second magnet each provide a magnetic field that interacts to form the first magnetic field, and wherein when the wire coil receives the electrical current, the second magnet is capable of switching to a polarity opposite a polarity of the first magnet such that the first magnet and the second magnet each provide a magnetic field that interacts to form the second magnetic field.

20. The method of claim 19, wherein the first magnetic field is characterized as having a first magnetic strength and wherein the second magnetic field is characterized as having a second magnetic strength less than the first magnetic strength.

* * * * *